Dec. 17, 1935.    J. S. MARSHALL    2,024,938
SPRAYING APPARATUS
Filed Jan. 6, 1934
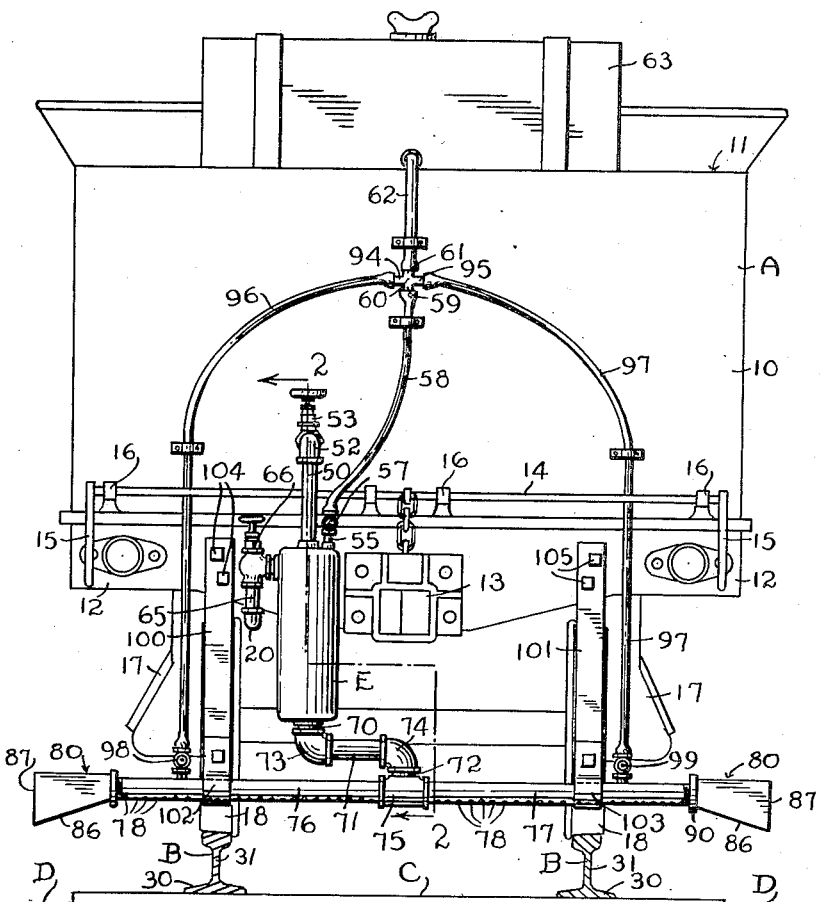
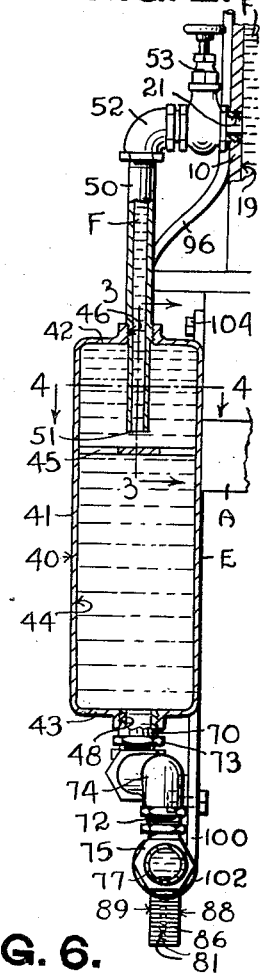
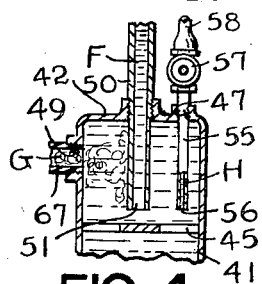
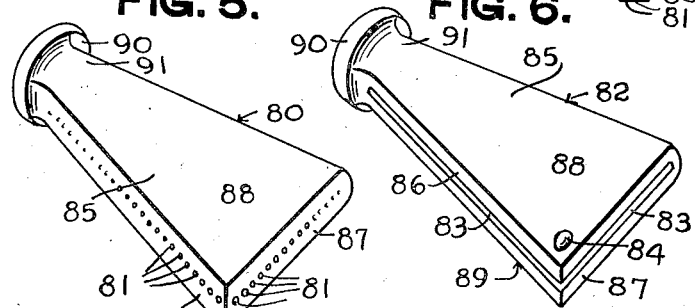
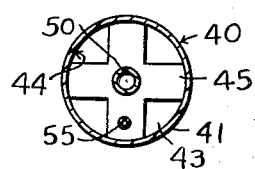
INVENTOR.
John S. Marshall
BY Lancaster, Allwine and Rommel
ATTORNEYS.

Patented Dec. 17, 1935

2,024,938

UNITED STATES PATENT OFFICE 2,024,938

SPRAYING APPARATUS

John S. Marshall, La Junta, Colo.

Application January 6, 1934, Serial No. 705,581

5 Claims. (Cl. 299—31)

This invention relates to vegetation exterminating apparatus and more particularly to such an apparatus for use on rolling stock, vehicles and the like. The principal object of the invention is to provide a vegetation exterminating apparatus, more commonly known as a weed exterminating apparatus, which employs a combination of chemicals, water and steam or, selectively, any one or two of these, for spraying upon vegetation for the purpose of killing such vegetation.

Another object of the invention is to provide such an apparatus wherein the chemical will be introduced into the apparatus for most effective mixing with the other constituents of the spray.

Another important object of the invention is to provide an alternate arrangement whereby the chemical may be concentrated for spraying only where it is most required.

Still another object is to provide such an apparatus which will take up but limited space and may be attached to standard rolling stock without making any material alterations.

Another object is to provide a practical vegetation exterminating apparatus which may be manufactured at a low cost and the upkeep of which will be nominal.

Other objects and advantages of the invention will be apparent during the course of the following detailed description, taken in connection with the accompanying drawing, forming a part of this specification and in which drawing:—

Figure 1 is an end elevation of a conventional locomotive tender with the improved apparatus attached thereto.

Figure 2 is a view substantially on the line 2—2 of Figure 1.

Figure 3 is a fragmentary view of the improved apparatus substantially on the line 3—3 of Figure 2.

Figure 4 is a horizontal section substantially on the line 4—4 of Figure 2.

Figure 5 is a perspective view of a perforated spray head which may be employed as a part of the apparatus.

Figure 6 is a view of a slotted spray head which may be employed as a part of the apparatus, taking the place of the spray head illustrated in Figure 5.

In the drawing, wherein for the purpose of illustration is shown only a preferred embodiment of the invention as a whole but novel types of spray heads particularly applicable thereto, and wherein similar reference characters designate corresponding parts thruout the several views, the letter A designates generally a vehicle which is adapted to travel upon rails B, carried upon conventional ties C, disposed upon a road bed D. To the vehicle A is attached the improved apparatus E which is adapted to receive and eject a selection of fluids such as water F, steam G and suitable chemicals H.

The vehicle A illustrated as an example of one to which the novel apparatus B may be attached is a standard locomotive tender including an end wall 10, a top wall 11, an end sill 12, carrying draft gear including a rearwardly projecting coupler 13 disposed on substantially the vertical medial axis of the end wall 10, horizontally disposed uncoupling rod 14 carrying a pair of handles 15 at either end and with the mid portion operatively attached to the coupler 13, as is well known in the art. This rod 14 is carried by upwardly projecting brackets 16 disposed upon the sill 12. Included in the illustration is also portions of a tender truck 17 and flanged wheels 18 of conventional construction. Ordinarily the rear end of a locomotive tender contains a compartment 19 containing water for use by the locomotive. A pipe 20 for steam ordinarily extends beneath the tender underframe and may be tapped or otherwise employed to convey steam from the locomotive to the apparatus, the volume of steam being regulated from the cab of the locomotive by manipulation of the steam valve at the fountain in the cab, all being conventional construction and well known to those employed in the art. The only alterations to this standard equipment are the tapping of the water supply which may be by means of a screw threaded opening 21 in the end wall 10 and preferably disposed somewhat below the horizontal medial line of the end wall and to one side of the vertical medial line thereof. The still may also be suitably perforated to accommodate the shanks of, for example, bolts which will be later described and provision is also made for suitably securing a chemical tank to the top wall 11 close adjacent the end wall 10.

The rails B in the example shown are the conventional ones, paralleling each other in pairs, as employed by railroads and include spreading base portions 30 to either side of the vertical web portions 31.

For the purpose of better explaining the value of the apparatus, a conventional tie C, carrying the rails B, is shown together with the road bed D to either side of the ties and, of course, between each pair of ties, the arrangement and disposition of all being well known in the art.

Now as for the novel apparatus E, the same includes an elongate, closed mixing vessel or tank 40 which is preferably of cylindrical shape having a vertical outer side wall 41 and opposite caps or end walls 42 and 43, providing a compartment 44 which is spanned intermediate its ends by a preferably cross-shaped baffle 45. As an example of the size of the tank, the same may be about six inches in diameter and substantially twenty-four inches long so that it may be disposed in the space between the coupler 13 and the end of the sill, and will not project outwardly beyond the coupler 13.

The upper end wall 42 is provided with a pair of openings or perforations, one opening 46 being on the longitudinal axis of the tank and the second or smaller opening 47 being disposed to one side of the other. The walls of these openings are preferably screw threaded. The opposite or lower end wall 43 has also an opening or perforation 48, preferably aligning axially with the opening 46 but larger in diameter. Adjacent the upper end wall 42 and, of course, well above the baffle 45 is an opening 49 in the side wall 41. The walls of both the openings 48 and 49 are preferably screw threaded.

Means for conveying water to the tank 40 and discharging the same into the tank at a point spaced inwardly of the walls 41 and 42 is shown particularly in Figure 2. This means preferably includes a pipe or tube 50 provided with exterior screw threads to engage those about the opening 46 and which pipe 50 extends down into the tank with its discharge end 51 spaced from the surface of the baffle 45 substantially one inch. Suitable conventional fittings 52 connect the opposite end of the pipe 50 to a valve 53 which is interposed to control the flow of water thru the pipe 50. The intake end of the valve 53 is disposed to receive water from the water compartment 19, thru the opening 21 in the end wall 10.

Means for conveying a second fluid, such as a suitable herbicide, to the tank 40 and discharging the same into the tank at a point spaced inwardly of the walls 41 and 42, is shown in Figures 1 and 3. This means includes a section of pipe or tube 55 which extends down into the tank 40 with its discharge end 56 preferably spaced above the surface of the baffle 45 substantially one inch. This tube 55 is exteriorly screw threaded to engage the screw threads upon the walls of the opening 47. It will be noted in Figure 4 that the pipes or tubes 50 and 55 are so disposed, with reference to the cross-shaped baffle 45, that the projections of their peripheries intersect the body of the baffle. Carried by the upper or intake end of the tube 55 is a valve 57 to control the volume of fluid passing thru the tube 55 and from the intake end of the valve 57 extends a tubing 58 which preferably has its other end connected to one arm 59 of a cross fitting 60 which is, of course, hollow. The opposite arm 61 of the fitting is provided with a tube 62 connected with the interior of a suitable chemical reservoir 63 containing the herbicide or similar chemical, which reservoir is preferably disposed upon the top wall 11 of the tender.

Means for conveying a third fluid, such as steam, to the tank 40 and discharging the same into the tank thru the perforation 49 is provided and includes a suitable pipe section 65 coupled to the steam pipe 20. A valve 66 for controlling the volume of steam, and a short pipe section 67 opening into the tank 40 at the perforation 49 are also provided. From Figure 3 it will be seen that the pipe 50 is interposed in the stream of steam from the perforation 49 and acts as a shield for the tube 55 which is smaller in diameter and disposed to the opposite side of the pipe 50 from the side of the latter facing the perforation 49. Consequently, the steam will not affect to any degree the chemical in the tube 55 until it emerges from the lower end of the tube 55 adjacent the baffle 45. Since the chemical and water enter the tank 40 relatively cold, and their flow from the tank is not impeded, the steam pressure and condensation is not great enough to create a back pressure and thus prevent flow of water and chemical to the tank.

Means for discharging the three fluids (or any one or two of them, as the case may be) from the mixing tank 40, includes a suitable number of pipe sections 70, 71 and 72 and pipe couplings 73 and 74, the last section 72 opening into a T-coupling 75 to which is coupled a horizontally disposed pair of pipe sections 76 and 77 which may be provided with suitable fluid discharge mouths, such as small perforations 78 extending in a spaced apart row along each section 76 and 77. If provided with mouths, the free ends of the pipe sections may be capped but it is found that it is far more desirable to provide each free end with a novel spray head, particularly adapted for just the objects of the invention.

Two examples of these spray heads are shown in Figures 5 and 6. Both are substantially alike in shape but one spray head 80 is provided with a plurality of perforated mouths 81 and the other spray head 82 with a continuous slotted mouth 83 and the latter type may also be reinforced by a bolt or pin 84. Each spray head preferably includes an elongate head portion 85 one (the lower) face 86 thereof sloping away from the outer end face 87, the perforated mouth 81 or slotted mouth 82 being in these faces. The side faces 88 an 89 are preferably flat and devoid of openings. An enlarged portion 90 at the smaller end 91 of the spray head is interiorly screw threaded for attachment of the spray heads to the free ends of the sections 76 and 77. The total length of the sections 76 and 77, their T coupling 75, and the spray heads, whether 80 or 82, when in place is not over the overall width of the tender, as may be seen from Figure 1. While, ordinarily, it is desirable to have the face 86 of either the spray head 80 or 82 facing downwardly, this face may be turned into other planes by slightly unscrewing the spray heads.

For the purpose of by-passing the chemical from the reservoir 63 past the tank 50, from the two remaining arms 94 and 95 of the cross fitting 60 extend tubing 96 and 97 towards the sections 76 and 77, the sections 76 and 77 being suitably tapped adjacent their outer ends to accommodate valves 98 and 99 to control the flow of chemical into the sections 76 and 77. Tubing 96 is connected to the intake of the valve 98 and tubing 97 to the intake of the valve 99.

Suitable means is provided to attach the apparatus to the vehicle and preferably comprises a pair of spaced apart depending straps or hangers 100 and 101 having rounded lower portions 102 and 103 to snugly accommodate a small portion of the pipe sections 76 and 77. The upper ends of the straps may be secured to the sill 12 by bolts 104 and 105.

By placing the inlets of the by-passed chemical (which of course enters the pipe sections 76 and 77 undiluted by the water) closely adjacent the spray heads, the persistent and stronger-rooted growth of weeds often encountered on the road bed on the outer sides of the rails may be attacked in a way it cannot if it is impossible to concentrate a stronger chemical there. The sloping face 86 of each spray head permits the spraying of hot water, water and chemical, or the more concentrated chemical back towards the rails and in a direction which will tend to cause most damage to the roots of the weeds. The outer end face 87 permits the projection of the spray outwardly along the right of way so that the seed-bearing weeds usually found on the average railroad right of way just beyond the reach of most sprayers for this purpose are disposed of satisfactorily. It is apparent that a slight adjustment of the spray heads will permit the spray issuing from the face 86 to strike weedy growths at a different angle, if required.

The water employed for diluting the chemical or for being heated and sprayed upon vegetation, is preferably derived from the water supply of the locomotive tender, as heretofore explained.

The steam G may be derived from the locomotive or provided by any suitable means.

While a liquid chemical H is shown, it is apparent that without invention, a chemical in powdered or granular form might be employed and find its way to the tank 40 or the spray heads by gravity.

In operation when installed as shown and described, with the several valves closed and the chemical tank 63 provided with a suitable herbicide or other chemical, if it is desired to utilize a hot solution of chemical of the same concentration along the whole road bed, the valves 53, 57 and 66 are opened which permits the flow of water F, chemical H and steam G into the compartment 44 of the tank 40. The steam will both heat the solution and, aided by gravity, force it out of the perforations 78 and mouths 81 or 83, as the case may be, in the nozzles 80 and 82. This will cause vegetation between the ties as well as beyond the ties to be sprayed and the force and distance of the spray may be controlled mainly by the valve 66.

If, now, it is desired to attack the vegetation outwardly of the outer faces of the webs 31 of the rails B more vigorously, the valves 98 and 99 may be opened and a portion of the concentrated chemical will enter the outer ends only of the pipe sections 76 and 77 and be sprayed from the spray heads, leaving a less concentrated chemical solution to be sprayed thru the perforations 78 inwardly of the spray heads.

Should it be desirable to spray only hot water between the rails B and concentrate a chemical outwardly of the rails, the valve 57 is closed and the valves 66, 53, 98 and 99 opened.

On the other hand, if it is desired to spray only outwardly of the rails B, the valves 53 and 57 are closed and the valves 66, 98 and 99 opened so that the steam will force the concentrated cremical thru the spray heads in a spray controlled by the valve 66.

A cold solution of chemical may be sprayed, depending upon gravity for its force, by closing the valve 66 and opening the valves 53 and 57 or opening the valves 53, 57, 98 and 99.

Thus it may be seen that a very wide selection of spraying effects may be secured by the arrangement disclosed, so as to cope with the varying conditions of weed growth. Very often weeds between the ties and inwardly of the rails are much branched, have poor root systems and are leathery, due to the natural pruning caused by the vehicles passing above, while weeds from outwardly of the rails increase in size of root systems but are less leathery or branched above ground and are able to produce seeds. It is desirable to reach these root systems if possible and this is accomplished by a spray projecting at an angle inwardly towards the base portions 30 of the rails, so that more than the upper portions of the weeds are reached.

While it is desirable to employ rubber for the tubing 58, 96 and 97, it will be noted that the tubing 96 and 97 is protected by the straps 100 and 101 and truck 17 and that the apparatus interferes in no way with the use of the draft gear.

The baffle 45 is so disposed with reference to the outlet ends 51 and 56 of the pipe 50 and tube 55 that the gravitational force of the falling water and chemical is broken and so that the two will mix while, by the disposal of the inlet of the steam well above the inlets of the water and chemical, the former will not interfere with the entry of the later.

Various changes may be made to the form of invention herein shown and described without departing from the spirit of the invention or the scope of the claims.

What is claimed is:

1. In a vegetation exterminating apparatus, a closed mixing tank having outer walls, an outlet and an interior baffle above said outlet, means for conveying a fluid to said mixing tank and for discharging said fluid into said tank and against said baffle at a point spaced inwardly of the inner surfaces of said tank's outer walls, means for conveying a second fluid to said mixing tank and for discharging said fluid into said tank and against said baffle at a point spaced inwardly of the inner surfaces of said tank's outer walls and spaced from the first named point, and means for conveying a pressure exerting fluid to said mixing tank and for discharging said pressure exerting fluid into said tank at a point spaced above said first named point and above said baffle.

2. In a vegetation exterminating apparatus, a closed mixing tank having outer walls, an outlet and an interior baffle, means for conveying a fluid to said mixing tank and for discharging said fluid into said tank at a point spaced inwardly of the inner surfaces of its outer walls including a hollow open ended member projecting into said tank with its open end spaced from said baffle and with the projection of its periphery intersecting said baffle, means for conveying a second fluid to said mixing tank and for discharging said fluid into said tank at a point spaced inwardly of the inner surfaces of its outer walls and spaced from the first named point including a hollow open ended member projecting into said tank and having a diameter less than the diameter of said first named hollow open ended member, the mouth of said second named hollow open ended member being spaced from said baffle and so positioned that the projection of its periphery intersects said baffle, and means for conveying a third fluid to said mixing tank and for discharging said third fluid into said tank at a point spaced from said two first named points and above said baffle and against said first named hollow member.

3. In an organism exterminating apparatus, a closed mixing tank having outer walls and a discharge port, means for conveying an organism exterminating fluid to said tank, including a conduit extending into said tank and having its outlet spaced from the outer walls thereof, means for conveying a diluent for said organism exterminating fluid to said tank including a conduit larger in diameter than the diameter of said first named conduit and extending into said tank, said second named conduit substantially paralleling the first named conduit and having its outlet spaced from the outer walls of said tank, and means for conveying a heated fluid to said tank including a conduit having its outlet in an outer wall of said tank and with the axis of its outlet substantially intersecting first the longitudinal axis of said second named conduit and thereafter substantially intersecting the longitudinal axis of said first named conduit, whereby said second named conduit performs the function of a shield for said first named conduit from the emerging heated fluid, as well as performs its ordinary function.

4. In a vegetation exterminating apparatus, a closed mixing tank; means for conveying a vegetation-exterminating chemical to said tank and for discharging said chemical into said tank, including a conduit extending interiorly and exteriorly of said tank; means for conveying a dilutent for said chemical to said tank and for discharging said dilutent into said tank; means for discharging a pressure-exerting fluid into said tank; discharge means for discharging said chemical and fluids from said mixing tank, including a substantially horizontally disposed conduit having a plurality of spaced-apart discharge openings extending radially thereof, and a spray-head; and means for increasing the volume of said vegetation-exterminating chemical discharged from said spray head with said two fluids, including a by-pass extending from said first-named conduit to said second named conduit and with its discharge mouth emptying into said second-named conduit at a point closely adjacent said spray head, whereby said pressure-exerting fluid will force said by-passed chemical toward said spray head and away from the greater number of said discharge openings in said last named conduit.

5. In a vegetation exterminating apparatus, a closed mixing tank; means for conveying a vegetation-exterminating chemical to said tank and for discharging said chemical into said tank, including a conduit extending interiorly and exteriorly of said tank; means for conveying a dilutent for said chemical to said tank and for discharging said dilutent into said tank; means for discharging a pressure-exerting fluid into said tank; discharge means for discharging said chemical and fluids from said mixing tank, including a substantially horizontally disposed conduit having a plurality of spaced-apart discharge openings extending radially thereof, and a spray-head; and means for increasing the volume of said vegetation-exterminating chemical discharged from said spray head with said two fluids, including a by-pass extending from said first-named conduit to said second named conduit and with its discharge mouth emptying into said second-named conduit at a point closely adjacent said spray head and with a minority of said discharge openings disposed between said discharge mouth and said spray head, whereby said pressure-exerting fluid will force said by-passed chemical toward said spray head and away from the greater number of said discharge openings in said last named conduit.

JOHN S. MARSHALL.